UNITED STATES PATENT OFFICE.

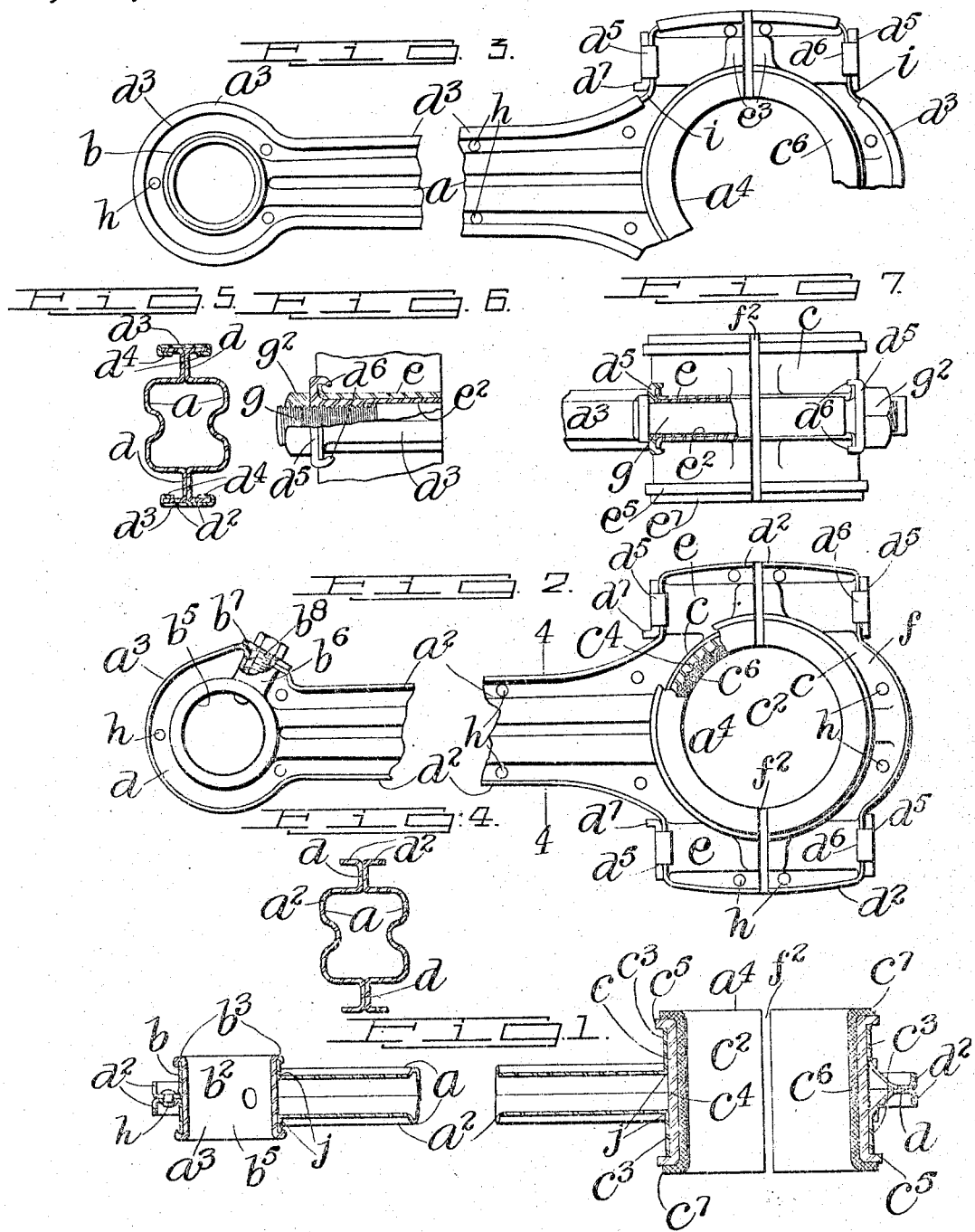

HEBRON B. LAYMAN, OF NEW YORK, N. Y., ASSIGNOR TO THE LAYMAN PRESSED ROD CO., INC., OF NEW YORK, N. Y., A CORPORATION OF NEW YORK.

CONNECTING-ROD.

1,226,978.  Specification of Letters Patent.  Patented May 22, 1917.

Application filed April 28, 1915. Serial No. 24,481.

*To all whom it may concern:*

Be it known that I, HEBRON B. LAYMAN, a citizen of the United States, and residing at New York, in the county of New York and State of New York, have invented certain new and useful Improvements in Connecting-Rods, of which the following is a specification, such as will enable those skilled in the art to which it appertains to make and use the same.

This invention relates to connecting rods more particularly of the kind made from sheet metal, and has among its objects to provide that articles of this character will possess great strength and still be light in weight. Other objects will appear from the ensuing descriptions and the advantages thereof will be apparent to those skilled in this art.

The constructions shown and described herein are, by way of example, also referred to in my previous issued Patent No. 1,176,301, dated March 21, 1916, for method of making connecting rods.

In the drawings:

Figure 1 is a longitudinal sectional view of a complete connecting rod made according to my invention, the section being in the plane of the crank shaft;

Fig. 2 a side view of the connecting rod shown in Fig. 1 with parts broken away.

Fig. 3 a view similar to Fig. 2 but showing only a part of the rod and showing a modification;

Fig. 4 a transverse section on the line 4—4 of Fig. 2;

Fig. 5 a view similar to Fig. 4 but showing a modification;

Fig. 6 a sectional detail view of a part of the larger end portion of the rod and on an enlarged scale, and showing certain details of construction; and, Fig. 7 a side view of the larger end portion of the rod at right angles to the crank shaft with parts broken away.

The rod here shown consists of two separate substantially similar parts $a$, stamped from sheet metal, and comprising a shank portion $a^2$, a smaller end portion $a^3$ and a larger end portion $a^4$. As in practice the smaller end portion may be connected to a piston and the larger end portion connected to a crank shaft, I will term the smaller end the "piston end" and the larger end the "crank end" of the rod.

The smaller end portion is provided with tubular side bosses $b$ through which the piston pin passes and which form a tubular bearing for said piston pin and, in this tubular bearing is mounted, placed or secured, a supplemental sleeve bearing $b^2$, the ends of which are rolled over the bosses $b$, as shown at $b^3$, and this strengthens both the bosses $b$ and the supplemental bearing $b^2$ and holds said supplemental bearing in place, and also prevents the spreading of the separate parts of the rods and produces a finished appearance for said parts.

The parts $b^2$ and $b^3$ form a tubular head $b^5$ through which, in practice, the piston pin is passed and in said head and at an acute angle to the axis of the shank of the rod is a key-pin boss $b^6$ having a sleeve $b^7$ through which is passed a screw-threaded key-pin $b^8$, the object of which is to secure the piston pin in its bosses or prevent its axial movement.

The larger end of the rod is provided with a large tubular head $c$ having a large central bore $c^2$ through which a crank of the crank shaft passes, and said head is formed by tubular side bosses $c^3$ on the separate parts of the rod and in which is placed a supplemental sleeve bearing $c^4$, the edges of which are turned outwardly as shown at $c^5$ to inclose the edges of the bosses $c^3$, and within the supplemental sleeve bearing $c^4$ is another sleeve bearing $c^6$ of Babbitt metal, the edges of which are turned outwardly as shown at $c^7$ to inclose, or partially inclose the ends of the supplemental bearing $c^4$.

The supplemental bearing $c^4$ is corrugated on its inner surface or provided with numerous recesses, or otherwise roughened, and the inner or Babbitt metal bearing $c^6$ is expanded, fitted or cast into these recesses or corrugations so as to secure said inner bearing in the supplemental bearing $c^4$ and prevent its rotation or movement therein in any direction.

The shank $a^2$ of the connecting rod is preferably of the form shown in Fig. 4 in cross section, and the separate parts of the rod are provided with flanges having abutting flat surfaces and which extend entirely around the rod longitudinally thereof and in the central plane in which the separate parts thereof are connected, and these abutting flanges are provided with laterally directed parts and form a T-shaped flange $d$, as clearly shown in Fig. 4 and which also extends around the rod longitudinally thereof, and the laterally directed parts $d^2$ of the T-shaped flange $d$ are inclosed, in the construction shown in Fig. 5, by a binding strip $d^3$, the edges of which are folded inwardly as shown at $d^4$, and this aids in securely binding the separate parts of the rod together and serves to strengthen said rod at all points.

The larger end of the rod is provided at the opposite sides thereof with bolt bosses $e$ formed partially in one part of the rod and partially in the other and parallel with the shank thereof and through which are passed reinforcing sleeve bearings $e^2$, and on the ends of the bolt bosses $e$ and reinforcing sleeve bearings $e^2$ are placed washers $d^5$, and at the outer or cap ends of said bosses and bearings the washers $d^5$ are flat and provided with side portions $d^6$ which are folded inwardly around the beaded edges of the laterally directed parts of the T-shaped flange $d$, and at the inner or rod ends of said bosses or bearings the washers $d^5$ are similarly formed, except at their inner edges where they are provided with raised lugs $d^7$.

The larger end or head portion of the rod is divided or sawed transversely after it has been formed as herein described to form a cap $f$ separated from the main part of the rod as shown at $f^2$ and, in practice, bolts $g$ are passed downwardly through the bosses $e$ and sleeves $e^2$ to bind the cap $f$ in position and the lower or outer ends of these bolts are provided with nuts $g^2$ which are free to turn on the washers $d^5$ and the inner ends thereof are provided with heads $g^3$ which are prevented from turning by the lugs or projections $d^7$ on the corresponding washers $d^5$, but it will be understood that my invention is not limited to the sawing or dividing of the larger end of the rod to form a cap, especially in the making of the smaller class of rods which are frequently made and used without caps.

In Fig. 6 of the accompanying drawings is shown a modification in which the boss $e$ is provided with a sleeve bearing $e^2$, which sleeve bearing is interiorly threaded to receive the bolt $g$, and capped with a lock nut $g^2$. The object of reinforcing the bolt bosses with the internal sleeves, thimbles or bushings, is to reinforce the bosses, and enable them to better resist the tension of the bolts and the strain that is thrown upon them in the operation of the connecting rod.

In the accompanying drawing, the separate parts of the connecting rod are secured together by rivets $h$ passed through the web portion of the T-shaped flange $d$, any desired number of which may be employed. In practice, after the separate parts of the rod are secured together, either by riveting or welding or in any other way, the rod so formed is brazed by immersion in a suitable flux and spelter which fills up all the interstices, cavities or recesses and makes a complete finished rod.

In Fig. 3 the bolt bosses $e$ are also provided centrally of the sides thereof with radial webs or reinforcements $e^3$, and the binding strip $d^3$ which is folded around the lateral edges of the T-shaped flange $d$ is cut away as shown at $i$, and the side wings $d^6$ of the washers $d^5$ are folded directly over the laterally directed side edges of said T-shaped flanges.

In the accompanying drawing two opposite sides of the shank $a^2$ of the connecting rod are curved as shown in Figs. 4 and 5, and the other two opposite sides are provided with the T-shaped flange $d$, but my invention is not limited to the exact form of the shank $a^2$ of the rod in cross section nor to other exact details herein shown and described.

It will be understood, of course, that the supplemental or inner sleeve bearings in the piston pin or crank pin bosses, and the inner Babbitt metal bearing in the crank or crank pin bosses reinforce the rods and prevent, or help to prevent the spreading of the separate parts thereof, and in this connection attention is called to the fact that the angles formed between the shank portion of the rod and said bosses at $j$ are right angles, and this also serves to strengthen the rod, or the shank portion thereof, and prevent the spreading thereof at the ends.

Wherever in the foregoing description or the following claims I use the phrases or words "a rod composed of two pieces," or "composed of abutting parts," or "formed from or of separate parts," I mean to imply that a cross section of the rod or the shank portion thereof, or an end portion thereof will show two pieces or abutting parts, and I do not wish to imply that the said pieces or parts are at all places separate from one another.

While I have referred in this specification to dividing the larger end of the rod transversely to form a cap, it should be understood that instead of forming one rod at a time, as herein shown and described, I may form two rods with the larger ends at the center, and then divide said rods or ends transversely to separate them, and then form or provide a cap for each rod when desired. Obviously, when I so form two rods together, I may similarly form two caps together and then separate them, as described in U. S. Letters Patent No. 1,176,301, granted to me March 21, 1916.

It is to be understood that the improvements heretofore referred to are applicable to other articles than connecting rods, such for example as links, levers and analogous articles, the term connecting rod being used for convenience in designation; and while the article particularly described above constitutes a preferred form of embodiment of my invention, yet the invention is susceptible of use in a variety of other forms all coming within the scope of the claims which follow.

Having fully described my invention, what I claim as new and desire to secure by Letters Patent, is:—

1. A connecting rod composed of parts abutting in a plane at right angles to the crank axis and having flanges around the crank shaft aperture.

2. A connecting rod composed of parts which abut around the crank shaft aperture and are provided with circumferential flanges in planes at right angles to said aperture.

3. A connecting rod formed of flanged parts abutting in a plane at right angles to the crank axis and having flanges around the piston pin aperture.

4. A connecting rod composed of a plurality of sheet metal parts which abut in a plane at an angle to the crank shaft axis and which are provided with radial flanges around the crank shaft aperture and approximately centrally thereof axially.

5. A connecting rod including a body portion and a cap portion, each of said portions being composed of sheet metal parts, the body portion having a piston pin aperture, the body and cap portions coöperating to provide a crank pin aperture; said portions being provided at their ends with strengthening and heat-radiating annular flanges.

6. A connecting rod, composed of portions abutting in a plane which intersects the crank axis at an angle, said portions having flanges around the crank shaft aperture.

7. A connecting rod cap composed of parts abutting in a plane at right angles to the crank axis.

8. A connecting rod having a cap composed of a plurality of parts permanently secured together.

9. A connecting rod composed of separate sheet metal parts and having a cap also composed of a plurality of sheet metal parts.

10. A connecting rod composed of a plurality of parts and having a cap composed of a plurality of parts permanently secured together.

11. A connecting rod provided with a cap composed of parts abutting in a plane at right angles to the crank axis and permanently secured together.

12. A connecting rod provided with a cap composed of parts abutting in a plane at right angles to the crank axis, said parts being provided with radial flanges around the crank shaft aperture.

13. A connecting rod provided with a cap composed of separate parts abutting in a plane at right angles to the crank axis, and metal clips whereby said parts are partially secured together.

14. A connecting rod composed of a plurality of sheet metal parts and provided with a crank shaft bearing, said rod being adapted to be separated through said bearing to form a cap, and having means for connecting the cap with the rod.

15. A connecting rod formed from sheet metal and provided with a bearing, said rod being adapted to be separated through the bearing to form a cap, and adapted to receive means for connecting the cap with the rod.

16. A connecting rod formed from sheet metal and adapted to receive means for attaching a cap, the said rod being provided with a crank shaft bearing, and adapted to be separated through the bearing to form a second part.

17. A connecting rod composed of abutting parts and having a key-pin boss formed by and between the abutting parts which compose the piston end of the rod.

18. A connecting rod formed of flanged abutting parts of sheet metal and having a piston pin boss, and the flanges of which form a reinforcing rib around the piston pin boss approximately centrally thereof axially.

19. A connecting rod composed of two substantially similar sheet metal parts having radial flanges extending around the piston pin aperture, and a reinforcing tubular member secured within said aperture.

20. A connecting rod formed of flanged abutting parts of sheet metal and having a crank pin boss, and the flanges of which form a reinforcing rib around the said boss approximately centrally thereof axially.

21. A connecting rod composed of sheet metal parts, and comprising a shank portion, a piston pin head portion having an aperture and a crank shaft head portion having an aperture, said parts having flanges which abut in a plane at right angles to the crank axis, and means for securing said parts together.

22. A connecting rod composed of sheet metal parts, comprising a shank portion and smaller and larger end portions, said end portions being provided with piston pin bosses and crank pin bosses, respectively, and said parts being provided with flanges which extend around the rod longitudinally thereof, and means insertible between the said flanges for securing the piston pin in its boss.

23. A connecting rod composed of sheet metal parts and comprising a shank portion and end portions, said end portions being provided with crank pin and piston pin bosses, and said parts abutting in a plane at right angles to the axis of said bosses, and said bosses being provided with flanged reinforcing sleeves.

24. A connecting rod consisting of sheet metal parts and comprising a shank portion, a piston pin head portion having an aperture, and a crank shaft head portion having an aperture, said parts having abutting flanges, means for securing said parts together, and reinforcing sleeves secured in said apertures.

25. A connecting rod composed of sheet metal parts and comprising a shank portion, and smaller and larger end portions, said end portions being provided with piston pin bosses and crank pin bosses respectively, and said parts having abutting flanges which extend around the rod longitudinally thereof, and are secured together.

26. A connecting rod composed of two abutting sheet metal parts, each comprising a shank portion and smaller and larger end portions, said end portions being provided with piston pin bosses and crank pin bosses respectively, and metal clips for securing the parts together.

27. A connecting rod, comprising a shank portion, a smaller end portion and a larger end portion, the said end portions being provided with crank pin and piston pin bosses, and said connecting rod being provided with a T-shaped flange which extends around the same longitudinally thereof and is formed integrally therewith.

28. A connecting rod, comprising a hollow shank portion, a smaller end portion and a larger end portion, said rod being composed of two similar parts of sheet metal, the said end portions being provided with crank pin and piston pin bosses, and said connecting rod being provided with a T-shaped flange which extends around the same and is formed from the separate parts thereof, said flange being provided with a binding strip which is passed around the same and the edges of which are folded inwardly around the lateral edges of the T-shaped flanges.

29. A connecting rod composed of sheet metal parts, and having a piston pin boss provided with a key-pin boss formed by and between said parts and having a sleeve lining therein.

30. A connecting rod composed of abutting parts and having bolt bosses formed by and between the abutting parts which compose the crank end of the rod.

31. A connecting rod composed of substantially similar parts and having bolt apertures formed by and between the said parts.

32. A connecting rod composed of a plurality of sheet metal parts and having bolt bosses formed thereby and therebetween, and means for securing said parts together.

33. A connecting rod composed of a plurality of sheet metal parts and provided with bolt bosses formed thereby and therein, and means uniting said parts and serving to form a seat for the heads of bolts passed through said bosses.

34. A connecting rod having an end formed from a plurality of parts which together form a recess adapted to receive a tubular bolt receiver.

35. A connecting rod composed of abutting parts and having bolt bosses formed by and between the abutting parts which compose the crank end of the rod, said bolt bosses being provided with reinforcing members.

36. A connecting rod composed of parts abutting in a plane at right angles to the crank axis and provided with ferrules through which are passed bolts to secure a cap to the rod body.

37. A connecting rod composed of two similar sheet metal parts and comprising a shank portion, a smaller end portion and a larger end portion, the larger end portion being provided with bolt bosses through which are passed bolts to secure the cap to the body of the larger end portion, the ends of said bolt bosses being provided with washers by which said bolt bosses are reinforced, said washers on one end of the bolt bosses being provided with means for preventing the turning of the bolts.

38. A connecting rod composed of similar sheet metal parts and comprising a shank portion, a smaller end portion and a larger end portion, the larger end portion being provided with bolt bosses through which are passed bolts to secure the cap to the body of the larger end portion, said bolt bosses being provided with interior reinforcements, the ends of said bolt bosses being provided with washers by which said bolt bosses are reinforced, said washers on one end of the bolt bosses being provided with means for preventing the turning of the bolts.

39. A connecting rod provided with a cap composed of substantially similar parts having bolt bosses formed by and between said parts.

40. A connecting rod composed of substantially similar parts having abutting flanges and bolt bosses formed by and between the parts composing the crank end of the rod, a portion of the crank end of the rod being adapted to be separated to form a cap.

41. A connecting rod having a crank shaft head composed of abutting parts, and said parts having bolt bosses formed by and between said parts, and means for securing said parts together, the crank shaft head of the rod being adapted to be cut transversely to form a cap.

42. A connecting rod provided with a cap composed of separate parts abutting in a plane at right angles to the crank axis and provided with ferrules through which are passed bolts to secure the cap to the body of the rod.

43. A connecting rod cap composed of a plurality of parts and provided with ferrules through which are passed bolts to secure the cap to the rod body, and means forming a reinforcing seat for the bolt heads.

44. A connecting rod composed of a plurality of sheet metal parts and provided with a bearing, said rod being adapted to be separated through the bearing to form a cap, the rod and cap portions having attaching bosses.

45. A connecting rod composed of a plurality of sheet metal parts and provided with a bearing, said rod being adapted to be separated through the bearing to form a cap, and the parts thus formed being provided with bolt apertures.

46. A connecting rod formed from sheet metal and provided with a bearing, said rod being adapted to be separated through the bearing to form a cap, the rod and cap portions having attaching bosses.

47. A connecting rod composed of similar sheet metal parts and united in a plane at right angles to the crank axis, and comprising a shank portion and smaller and larger end portions, the larger end portion being adapted to be divided transversely of the axis of the shank to form a cap and the separate parts of said end portion thus formed being provided with tubular bosses adapted to receive bolts to secure the cap to the other part of said end portion.

48. A connecting rod having a crank end composed of a plurality of parts which abut in a plane at right angles to the crank shaft aperture and are provided with tubular bosses formed therein and thereby, the crank end being provided with a cap, and said bosses being adapted to receive bolts to secure the cap to the rod.

In testimony that I claim the foregoing as my invention I have signed my name in presence of the subscribing witnesses this 26th day of April, 1915.

HEBRON B. LAYMAN.

Witnesses:
  C. MULREANY,
  H. E. THOMPSON.